United States Patent
Szabo

(10) Patent No.: US 12,123,712 B2
(45) Date of Patent: Oct. 22, 2024

(54) FLUID LANCE STOP POSITION SENSOR DETECTION METHOD AND SYSTEM

(71) Applicant: STONEAGE, INC., Durango, CO (US)

(72) Inventor: Daniel Szabo, Durango, CO (US)

(73) Assignee: STONEAGE, INC., Durango, CO (US)

( * ) Notice: Subject to any disclaimer, the term of this patent is extended or adjusted under 35 U.S.C. 154(b) by 0 days.

(21) Appl. No.: 18/378,012

(22) Filed: Oct. 9, 2023

(65) Prior Publication Data

US 2024/0118069 A1  Apr. 11, 2024

Related U.S. Application Data

(63) Continuation of application No. 17/102,773, filed on Nov. 24, 2020, now Pat. No. 11,781,852.

(51) Int. Cl.
*G01B 7/00* (2006.01)
*H04L 5/00* (2006.01)
*B08B 3/02* (2006.01)

(52) U.S. Cl.
CPC .......... *G01B 7/003* (2013.01); *H04L 5/0005* (2013.01); *B08B 3/02* (2013.01); *B08B 2203/0247* (2013.01)

(58) Field of Classification Search
CPC ........ G01V 3/10; G01B 7/003; H04L 5/0005; B08B 3/02; B08B 2203/0247
See application file for complete search history.

(56) References Cited

U.S. PATENT DOCUMENTS

| | | | | |
|---|---|---|---|---|
| 11,781,852 B2 * | 10/2023 | Szabo | ...................... | G01V 3/10 324/207.17 |
| 2005/0253711 A1 * | 11/2005 | Nelson | .................. | F41H 11/136 340/552 |
| 2010/0127705 A1 * | 5/2010 | Scharfetter | .............. | A61B 5/05 324/318 |
| 2020/0132402 A1 * | 4/2020 | Schneider | ............. | F28G 15/003 |

* cited by examiner

*Primary Examiner* — Eman A Alkafawi
*Assistant Examiner* — Suresh K Rajaputra
(74) *Attorney, Agent, or Firm* — James H. Ortega; Stephen Y. Liu; Carstens, Allen & Gourley, LLP

(57) ABSTRACT

A system for distinguishing target metal objects from each other in close proximity to each other. The method includes transmitting a first sinusoid signal via a first transmit coil to a first receive coil in close proximity to the first transmit coil; transmitting a second sinusoidal signal at a second frequency and amplitude different from the first frequency and amplitude to a second receive coil arranged in close proximity to the second transmit coil and in close proximity to the first receive coil such that received signals in the first and second receive coils include first and second frequency signals from the other of the first and second transmit coils. The received signals are separated via frequency domain multiplexing. The signals are compared to detect a presence of the target having a signal magnitude different from the first received signal and the received second signal and a known reference point.

20 Claims, 9 Drawing Sheets

FLUID LANCE STOP POSITION SENSOR DETECTION METHOD AND SYSTEM

CROSS REFERENCE TO RELATED APPLICATIONS

This application is a continuation patent application of co-pending U.S. patent application Ser. No. 17/102,773 entitled "Fluid Lance Stop Position Sensor Detection Method and System" filed on Nov. 24, 2020, the technical disclosure of which is hereby incorporated by reference in its entirety.

BACKGROUND OF THE DISCLOSURE

The present disclosure is directed to metal object detection and distinguishing a particular metal object in the presence of other metal detectors and other interfering signals.

SUMMARY OF THE DISCLOSURE

One exemplary embodiment, for example, may be utilized in multiple high pressure waterblasting lance positioning systems. In such an application, the metal detection device must be able to distinguish presence of a metal object from other metal objects and other metal detectors in close proximity while at the same time being able to discriminate a target metal object from other closely associated materials and dielectrics such as water. The present disclosure is particularly directed to one application, that is an apparatus and a system for distinguishing individual high pressure waterblasting lance mechanical stops on high pressure waterblasting lances from others in close proximity to each other.

The objective is to detect the presence of metal, with and without the presence of water, individually in a very tight proximity to other detectors and objects, and at the same time maintain a quick response time. This is achieved with inductive sensors, each of which includes an axially aligned set of coils, one being a transmitter coil and the other being a receiver coil. In one exemplary embodiment there are three side by side sets of two axially aligned coils that are together encased in a potted housing so as to form a module with three passages or bores therethrough. Each coil set encircles one of the three bores through the housing. A flexible lance hose carrying high pressure water passes through each of the bores.

Each coil set contains a transmit coil and a receive coil, separated by a spacer or wear ring. The transmit coils are electromagnetically excited by electrical current waveforms or signals at different frequencies. The receive coils sense these current waveforms or signals. In order to prevent cross talk between coil sets in such tight physical proximity, multiplexing techniques are required. Traditionally, time domain multiplexing would be used, which utilizes high frequency transmit signals. This would allow for each coil set to be turned on and off individually, while still maintaining a sufficient response time. However, at high frequencies, dielectrics like water are also detected which obscures the ability to distinguish metal from other metal or non-metal objects. However, at lower frequencies, such as below about 30 kHz, these dielectrics are not detected. Their sensed signals are processed using frequency domain multiplexing. By precisely choosing and varying lower frequency transmit signals, it has been found that dielectrics like water are not detected and continuous processing of received signals is possible and allows for the response time to remain short, without unwanted readings crossing over from a neighboring coil set.

One exemplary embodiment in accordance with the present disclosure is a method for distinguishing a target metal object from at least one other object in close proximity to the target metal object. The method includes transmitting a first sinusoid signal at a first frequency and amplitude via a first transmit coil to a first receive coil arranged in close proximity to the first transmit coil to generate a first received signal, transmitting a second sinusoidal signal at a second frequency and amplitude different from the first frequency and amplitude via a second transmit coil to a second receive coil arranged in close proximity to the second transmit coil and in close proximity to the first receive coil. The received signals in the first and second receive coils include first and second frequency signals from the other of the first and second transmit coils. The method next includes separating the received signals via frequency domain multiplexing into the received first signal corresponding to the first sinusoid signal and a received second signal corresponding to the second sinusoid signal. Finally, the method includes detecting a presence of a target material having a received first signal different from the first received signal without presence of the target material. In one embodiment the target metal object is a metal stop collar on a first flexible hose. The at least one other object is a second flexible hose adjacent the first flexible hose.

If a third hose is present, a third sinusoid signal may be transmitted at a third frequency and amplitude via a third transmit coil to a third receive coil arranged in close proximity to the third transmit coil to generate a third received signal. The third sinusoidal signal is at a third frequency and amplitude different from the first frequency and amplitude and the second frequency and amplitude via a third transmit coil to a third receive coil arranged in close proximity to the third transmit coil and in close proximity to the first and the second receive coils such that received signals in the first and second receive coils include first and second and third frequency signals from the other of the first and second transmit coils. The method further includes separating the received signals via frequency domain multiplexing into the received first signal corresponding to the first sinusoid signal and a received second signal corresponding to the second sinusoid signal and a received third signal corresponding to the third sinusoid signal.

In such an embodiment involving three flexible lances, the target metal object may be a metal stop collar on at least one of three flexible lance hoses. The second flexible lance hose is adjacent the first flexible hose and the third flexible hose. The method includes comparing the signal magnitudes of the first and second received signals. The method may include comparing the signal magnitudes of each of the first, second and third received signals to determine a change in magnitude of one of the signal magnitudes different from the other two magnitudes. In such an embodiment, the three flexible lances are driven by a lance drive. Each flexible lance has a stop collar arranged at the front end of the lance hose and one at a rear of the lance hose, i.e. behind the lance drive, so as to prevent excessive extension of the lance hose through a heat exchanger tube into which the lance hose is driven. Accordingly, there is a detector in accordance with the present disclosure at the front end and the rear end of the lance drive as will be described further below. During operation, a common material, e.g. a metal braid within each of the lance hoses, provides a common change in magnitude of sensed signal, which can be subtracted out.

Alternatively an embodiment may be viewed as a method of detecting a hose stop collar on one of a plurality of flexible lance hoses arranged in close proximity to each other including sending a first sinusoidal signal at a first frequency to a first transmit coil arranged around one of the plurality of flexible lance hoses, sending a second sinusoidal signal at a second frequency different from the first frequency to a second transmit coil arranged around a second one of the plurality of flexible lance hoses, receiving a first received signal at the first frequency in a first receive coil transmit coil, receiving a second received signal at the second frequency in a second receive coil arranged around the second one of the plurality of flexible lance hoses adjacent the second transmit coil, wherein the second receive coil also receives the first received signal at the first frequency, wherein the first receive coil also receives the second received signal at the second frequency, and separating the received first and second signals via frequency domain multiplexing into a separate first sinusoidal signal corresponding to the first received signal from the one of the lance hoses and a second sinusoidal signal corresponding to the second received signal from the second one of the flexible lance hoses. The method may further include converting the separated first and second received sinusoidal signals into digital signals for further processing. The digital signals correspond to magnitude and phase of each of the first received signal and the second received signal. The method may further include comparing the magnitude and phase of the separated first received signal to a predetermined value to determine presence of a portion of the stop collar on the one of the plurality of flexible lance hoses within the first transmit coil. The method may further include comparing the magnitude and phase of the separated second received signal to another predetermined value to determine presence or absence of a portion of another stop collar on another one of the plurality of flexible lance hoses within the second transmit coil. Preferably the magnitude of the received first signal is greater when a portion of a stop collar passes within the first transmit coil than when the stop collar is outside of the first transmit coil. The magnitude of the received second signal is greater when a portion of a stop collar passes within the second transmit coil than when the stop collar is outside of the second transmit coil.

Alternatively an embodiment in accordance with the present disclosure may be viewed as a system for detecting a hose stop collar on one of a plurality of flexible lance hoses arranged in close proximity to each other. The system includes an oscillator configured to generate and send a first sinusoidal signal at a first frequency to a first transmit coil arranged around one of the plurality of flexible lance hoses. A second oscillator is configured to generate and send a second sinusoidal signal at a second frequency different from the first frequency to a second transmit coil arranged around a second one of the plurality of flexible lance hoses. A first receive circuit for receiving a first received signal at the first frequency in a first receive coil arranged around the one of the plurality of flexible lance hoses adjacent the first transmit coil. A second receive circuit for receiving a second received signal at the second frequency in a second receive coil arranged around the second one of the plurality of flexible lance hoses adjacent the second transmit cod, wherein the second receive coil also receives the first received signal at the first frequency, wherein the first receive coil also receives the second received signal at the second frequency. The system further includes a processor for separating the received first and second signals via frequency domain multiplexing into a separate first sinusoidal signal corresponding to the first received signal from the one of the lance hoses and a second sinusoidal signal corresponding to the second received signal from the second one of the flexible lance hoses.

The system preferably includes a converter for converting the separated first and second received sinusoidal signals into digital signals for further processing. The digital signals correspond to magnitude and phase of each of the first received signal and the second received signal.

DETAILED DESCRIPTION

Figure 1:
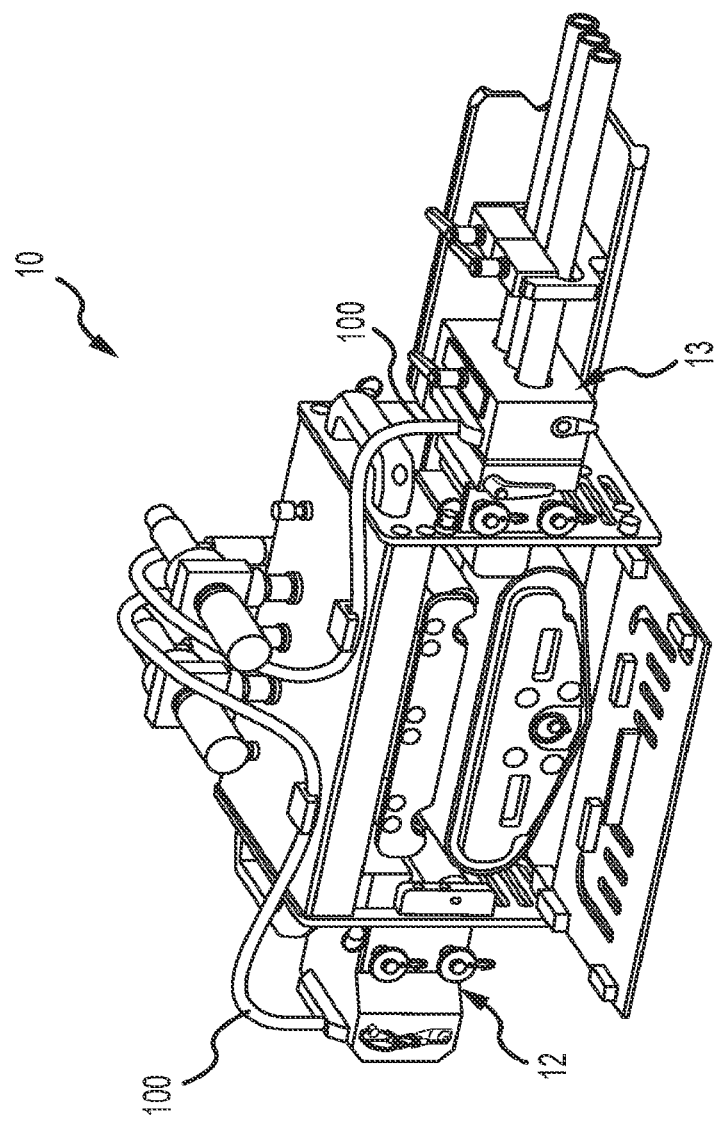
FIG. 1 is a side perspective view of an exemplary three lance hose tractor drive incorporating two lance stop sensor modules in accordance with the present disclosure.
Figure 2:
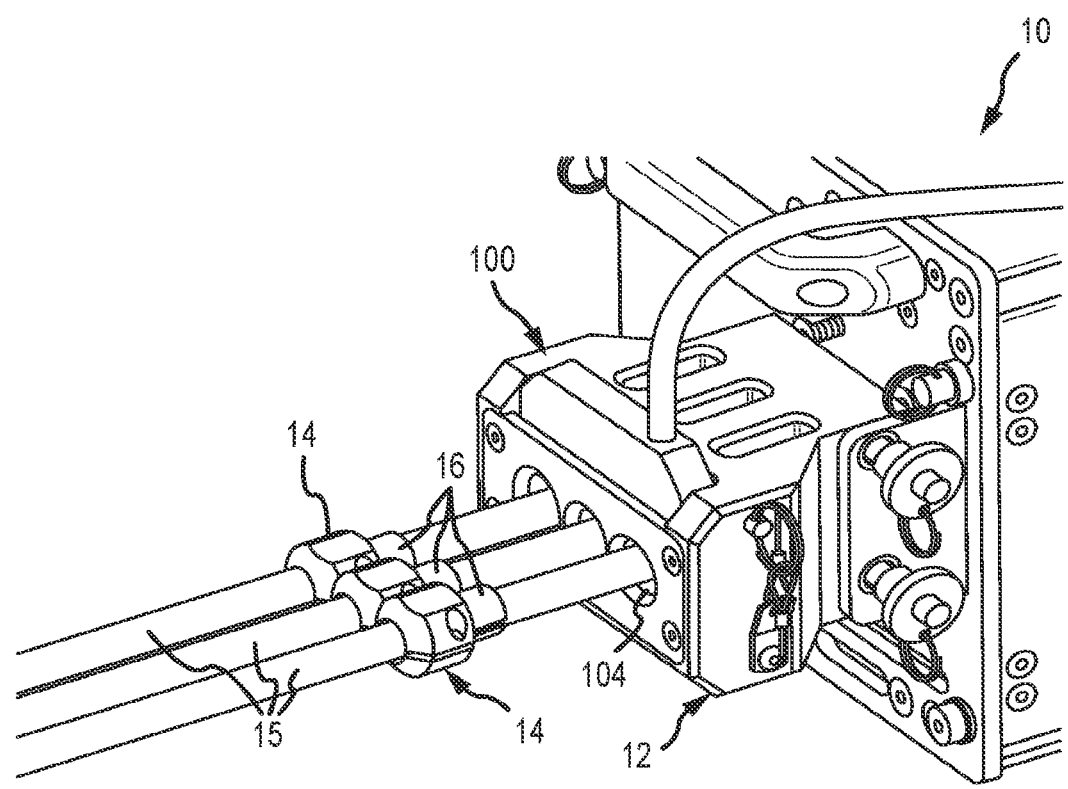
FIG. 2 is an enlarged partial rear view of the lance tractor drive shown in FIG. 1.

FIG. 1 is a perspective view of an exemplary application of sensors in accordance with the present disclosure. FIG. 1 shows a multiple flexible lance tractor drive 10 incorporating exemplary embodiments of a stop position sensor module 100 in accordance with the present disclosure. This tractor 10 is configured to reversibly drive from one to three flexible high pressure fluid lances 102, visible as shown in FIG. 2. This tractor drive 10 has a stop position sensor module 100 in accordance with the present disclosure carried in the inlet block 12 and another stop position sensor module 100 carried in the lance guide tube outlet block 13 of the tractor 10.

FIG. 2 is a perspective view of the rear of the tractor drive 10 showing three flexible lance hoses 15 being pulled simultaneously into and through the tractor drive 10. Each of the lance hoses 15 has a metal stop collar 14 fastened thereto so as to prevent excessive insertion of each of the hoses 15 into the tractor drive 10. These three hoses 15 pass through a stop detection module 100 mounted in a slot in the inlet block 12 of the tractor 10, and are closely arranged, side by side.

Figure 3:
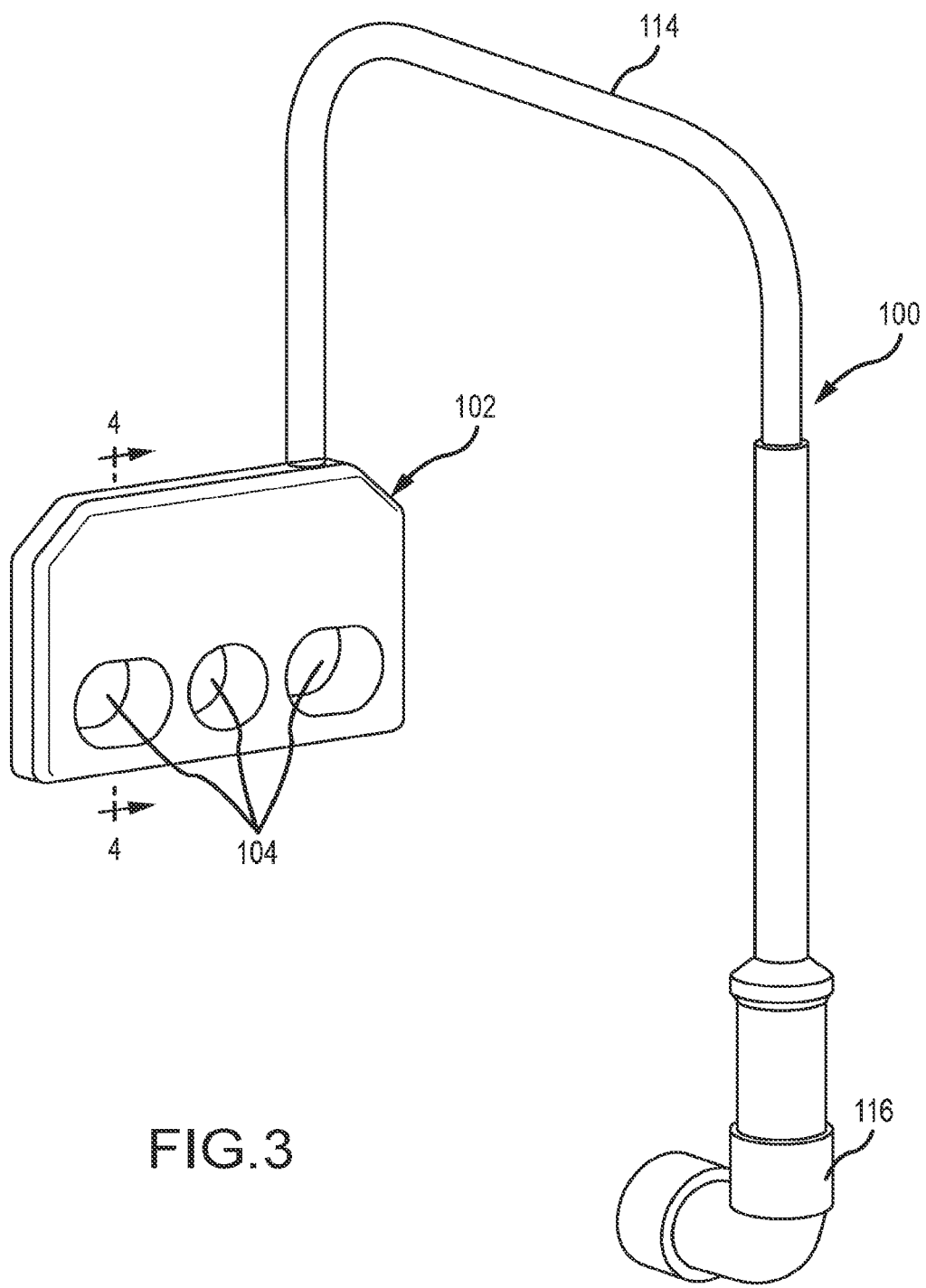
FIG. 3 is a separate perspective view of a sensor module in accordance with the present disclosure removed from the lance tractor drive shown in FIG. 2.

A perspective view of a module 100 in accordance with the present disclosure removed from the tractor 10 is separately shown in FIG. 3. Module 100 has a generally rectangular box housing 102 that has three bores 104 therethrough arranged side by side, each sized to receive one of the flexible lance hoses 15 therethrough and receive an elongated portion 16 of the metal stop collar 14 within the bore 104 when the hose 15 has been pulled fully through the tractor drive 10. It is this metal stop collar 14 that prevents the tractor drive 10 from further driving the hose 15.

Figure 4:
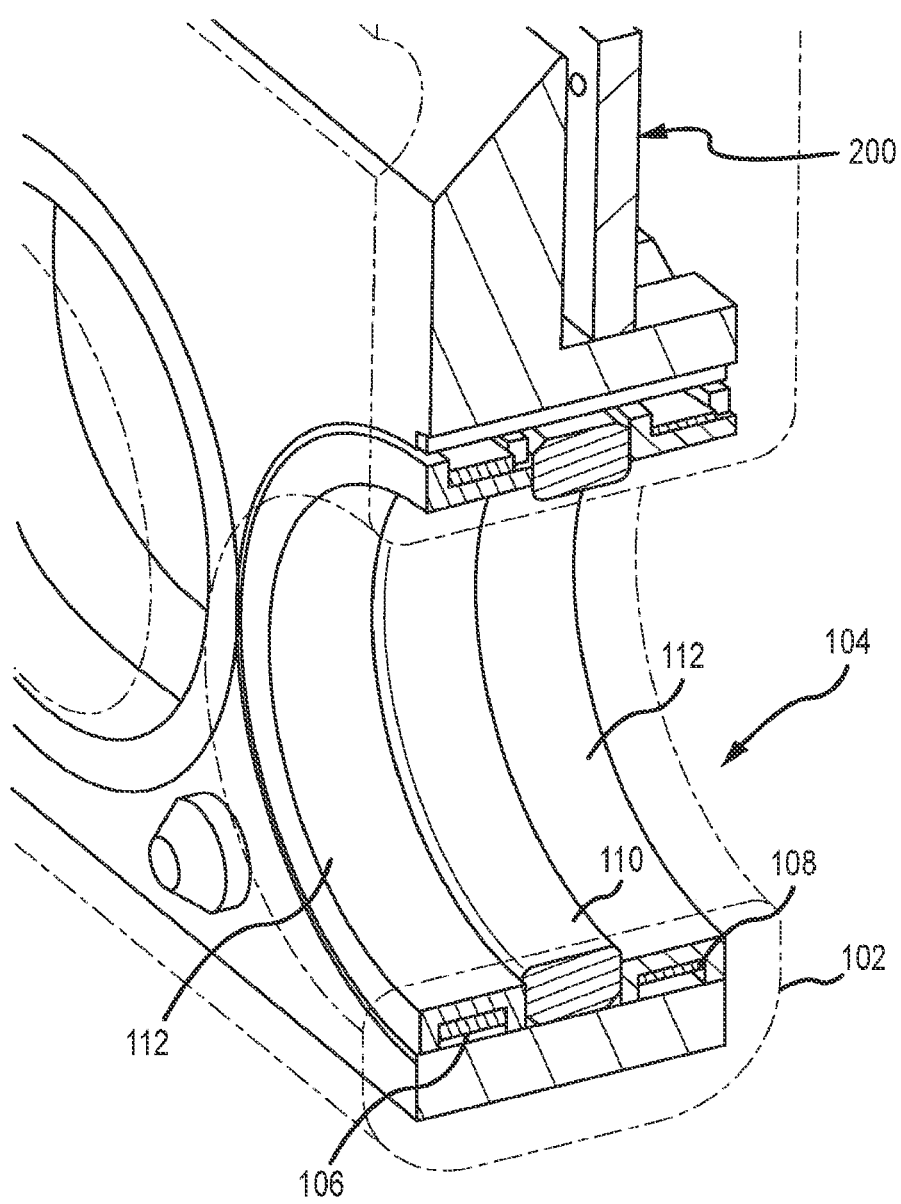
FIG. 4 is a sectional perspective view through the sensor module taken along line 4-4 in FIG. 3.

A partial sectional view through the module 100 is shown in FIG. 4 with the potted polymeric housing 102 shown in phantom lines. Within the housing 102, encircling each bore 104, is arranged a set of two axially aligned coils: a transmit coil 106 and a receive coil 108. These coils 106, 108 are axially spaced apart by a wear ring 110. Further, each of the transmit and receive coils 106 and 108 are each wound on a protective spool 112. Together the wear ring 110 and the two spools 112 sandwiching the wear ring 110 define the bore 104 for receiving a lance 15 therethrough as shown in FIG. 2. Electrical connections to the coils 106 and 108 are potted in the housing 102 and the two lead wires from each coil 106, 108 are fed to signal processing circuit 101 shown in FIG. 5 also potted within the module 100. A cable 114 leading between circuit 101 and a 6 pin connector 116 provides DC power to the signal processing circuit 101. The magnitude and phase data output of circuitry 101 is digitized through a microprocessor within the module 100 and fed via a serial communication protocol on an output pair of leads in the cable 114 to a remote controller (not shown) for the tractor drive 10.

In the module 100, each transmit coil 106 is excited at a different sinusoidal frequency. As an example, the left one shown in FIG. 3 may be excited at 1.6 kHz. The middle one shown in FIG. 3 may be excited at 2.0 kHz. The right transmit coil may be excited at 2.5 kHz. The separation of frequencies needs to be wider than the useable bandwidth by some margin in order to minimize cross talk between the adjacent sensors. One exemplary bandwidth is 250 Hz, which is sufficient to minimize cross talk between adjacent sensors.

Figure 5:
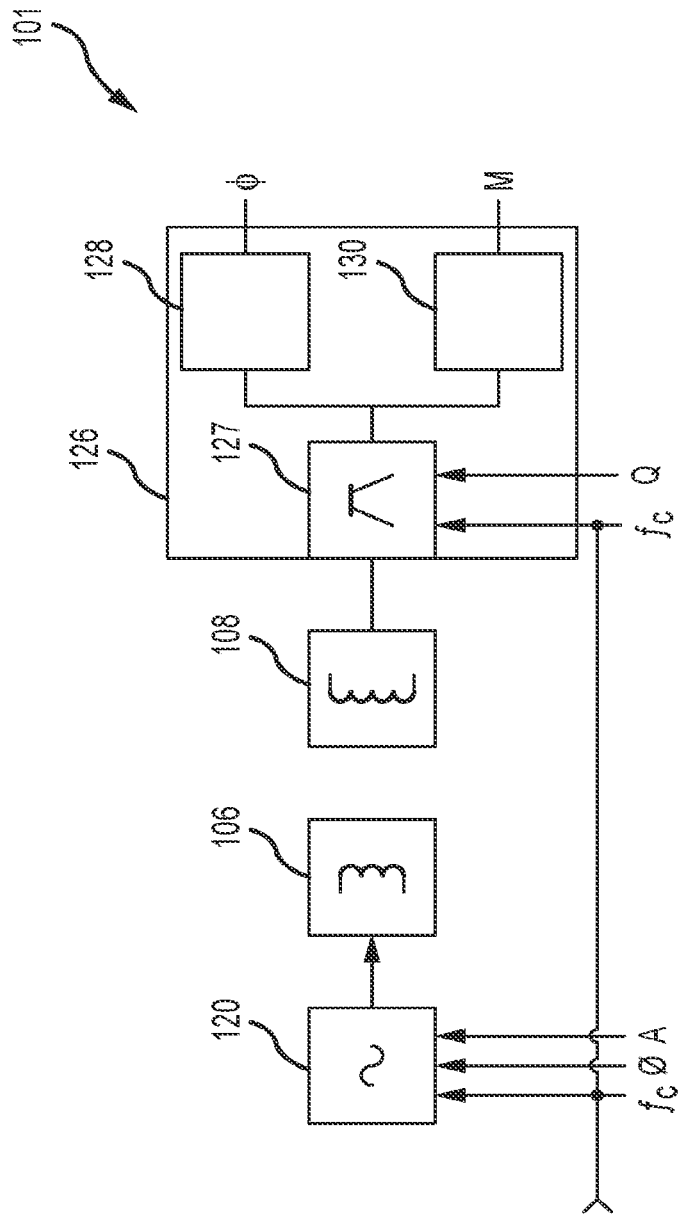
FIG. 5 is a simplified functional block diagram of an exemplary signal processor for one of the three sensors contained in the sensor module shown in FIG. 3.

A general functional diagram of the signal processing circuitry 101 for each detector 101 comprising a coil set 106 and 108, is shown in FIG. 5. In module 100, there are three separate circuits as shown. In general, FIG. 5 depicts a nominal implementation of a metal sensor or detector 101 providing a mechanism such that the nominal characteristics of the detector 101, including phase, φ, magnitude, M, for a given frequency, $f_c$, are modified given the presence of a target material T. This material T, in this exemplary implementation, is the stop collar 14 as it enters an exemplary one of the bores 104 of the module 100 during operation of the tractor drive 10.

The circuit 101 comprises an oscillator, 120, a transmitting device 122, a receiving device, 124, and an analyzer, 126. The oscillator 120 in each of the three identical circuits generates a different frequency signal $f_c$. The oscillator 120 features the common characteristics of frequency, phase, and amplitude. A preferred implementation of the transmitting device, in the illustrated module 100, is a coil of wire 106, such that the applied transmit signal, is a either a voltage a current. In the preferred implementation, the receiving device is a second coil of wire 108 arranged such that the received signal is a voltage or a current induced in the receive coil 108. The analyzer 110 discriminates the magnitude and phase characteristics of the received signal.

In general, the theory of operation basically includes, given a transmitted signal, x, having an oscillation frequency $f_c$, a phase φ, magnitude, M, and a received signal, y, with similar parameters of phase and magnitude, it is approximated that for any given static proximity of target material T, the system is linear time-invariant (LTI). As such, the received signal y is equal to the convolution of the corresponding impulse response, h, with the transmitted signal:

$$y(t)=h(T,t)*x(t)$$

Note that the impulse response is a function of the target material T.

By definition, the Fourier transform provides the following equality:

$$Y(f) = H(T, f)X(f)$$

$$H(T, f) = \frac{Y(f)}{X(f)}$$

Put plainly, the transfer function, H, (defined as the Fourier transform of the impulse response) can be directly computed as the ratio of the Fourier transforms of the received and transmitted signals. By applying sinusoids and/or other deterministic waveforms to the system, H, can be approximated at discrete and/or varying frequencies. For example, if a static sinusoid is transmitted, it is assumed that the Fourier transform of the input and output signals are at the frequency of the sinusoid, and that the magnitude end phase of H, are well approximated by the analyzer circuit 126.

In the preferred implementation, the magnitude and phase of the transmitted signal are intrinsically known but could be measured by an additional analyzer such as analyzer circuit 126 applied to the transmitted signal.

The preferred implementation includes measurement of both phase, 128, and magnitude, 130. It should be noted that an implementation that does not include both world still be considered to be characterized as an instance of analyzer circuit 126.

The preferred implementation optionally includes a bandpass filter 127, of a given quality factor, Q, such that Q determines how selective the filter is at the expense of responsiveness to changes in the desired frequency characteristics, and is tuned to the frequency of the transmitted sinusoid to reduce noise in the measurement, as well as distinguish the desired signal from signals from the adjacent sets of coils 106, 108.

The circuitry 101 of the sensor module 100 in accordance with the present disclosure integrates multiple instances of FIG. 5, (in this case 3) one for each set of transmit and receive coils 106, 108 and one or more instances of the target, T, i.e., each of the hoses 12 and/or presence of hose stop collar metal 16 such that each circuit 126 operates at different sinusoidal frequencies, with the requirement of including tuned band-pass filters 127, and a matched center frequency to the applied frequencies. The inclusion of the band pass filters 127 provides rejection of frequency components generated by the other nearby transmitter coils 106.

In other words, the oscillator $120_1$ for transmit coil $106_1$ produces a different sinusoid signal $f_1$ than the sinusoid signal $f_2$ produced by oscillator $120_2$ and a still different sinusoid signal $f_3$ from oscillator $120_3$. The receive coils 108 are closely spaced next to each other. Hence the signals received by each of the receive coils $108_1$, $108_2$, and $108_3$ will be a combination of sinusoid signals from all three of the transmit coils $106_1$, $106_2$, $106_3$. Because these transmit and receive coil sets are closely spaced side by side, each tends to pick up the signal from an adjacent set. However, because the frequencies of the transmit coils are chosen in the kilohertz range rather than in high megahertz frequencies, the signal response for each can be separated according to the $f_c$ of the particular oscillator 120. Most importantly, however, is the fact that at the kilohertz frequencies chosen, the presence of water does not mask the presence of a metal such as the extension portion 16 of the stop collar 14 entering within the bore 104 of the module 100. Hence the magnitude of signal produced by the analyzer circuit 126 when the extension portion 16 is within bore 104 is much greater than when only the lance 15 hose (typically full of water) is present within the bore 104.

Finally, the receive signals are fed to the PCBA 101, processed, and thence measured phase/magnitude data is fed over the serial communication link in the single multithread cable 114. The result is that there are signals of many frequencies that must be separated and analyzed in the three analyzer circuits 126. The analyzer circuit 126 thus is preferably a frequency domain (division) multiplex analyzer circuit that simultaneously analyzes and separates out each of the three signals based on the unique $f_c$ for that particular transmit and receive coil set 106, 108.

The module 100 in accordance with the present disclosure, coupled with the above described circuitry 101, enables detection and discrimination of, hence distinguishing between individual metal objects in close physical proximity from others without interference between the instances.

Figure 6:
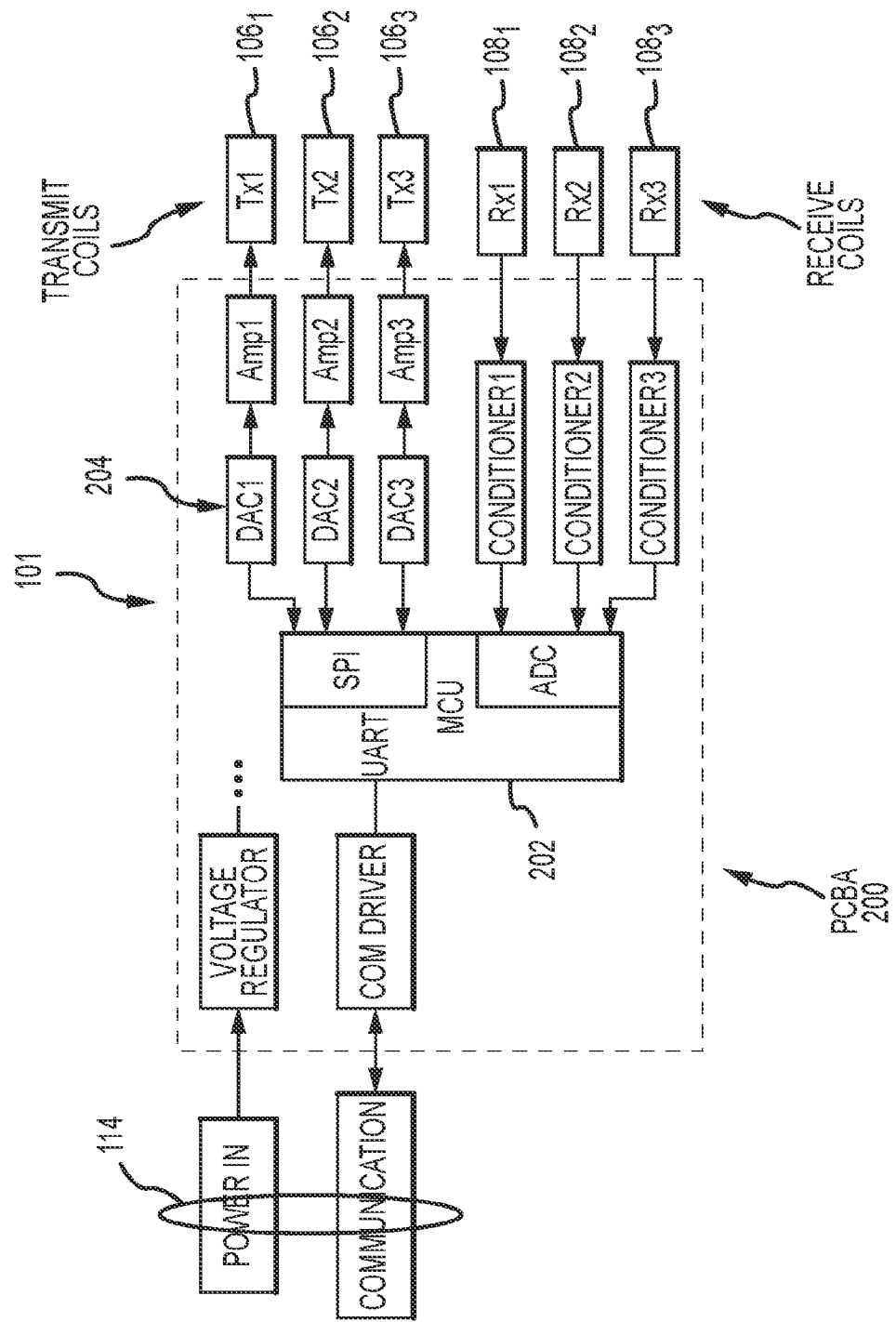
FIG. 6 is a basic overall block diagram showing the signal processor circuit on the printed circuit board embedded in the sensor module.

FIG. 4 shows a sectional view through the module 100 revealing the configuration of the three transmit/receive coil sets 106, 108 and a printed circuit board (PCB) 200 housed therein upon which the circuitry 101 is fixed. FIG. 6 shows a more detailed block diagram of the printed circuit board 200 within the module 100. This circuit board 200 houses the circuit 101 including the analyzer circuit 126 generally described above. The cable 114 which is attached to the circuit board 200 carries two wires that provide DC power to the circuit 101 and a twin lead communication pair that provides digital signal output to the remote controller (not shown).

Figure 8:
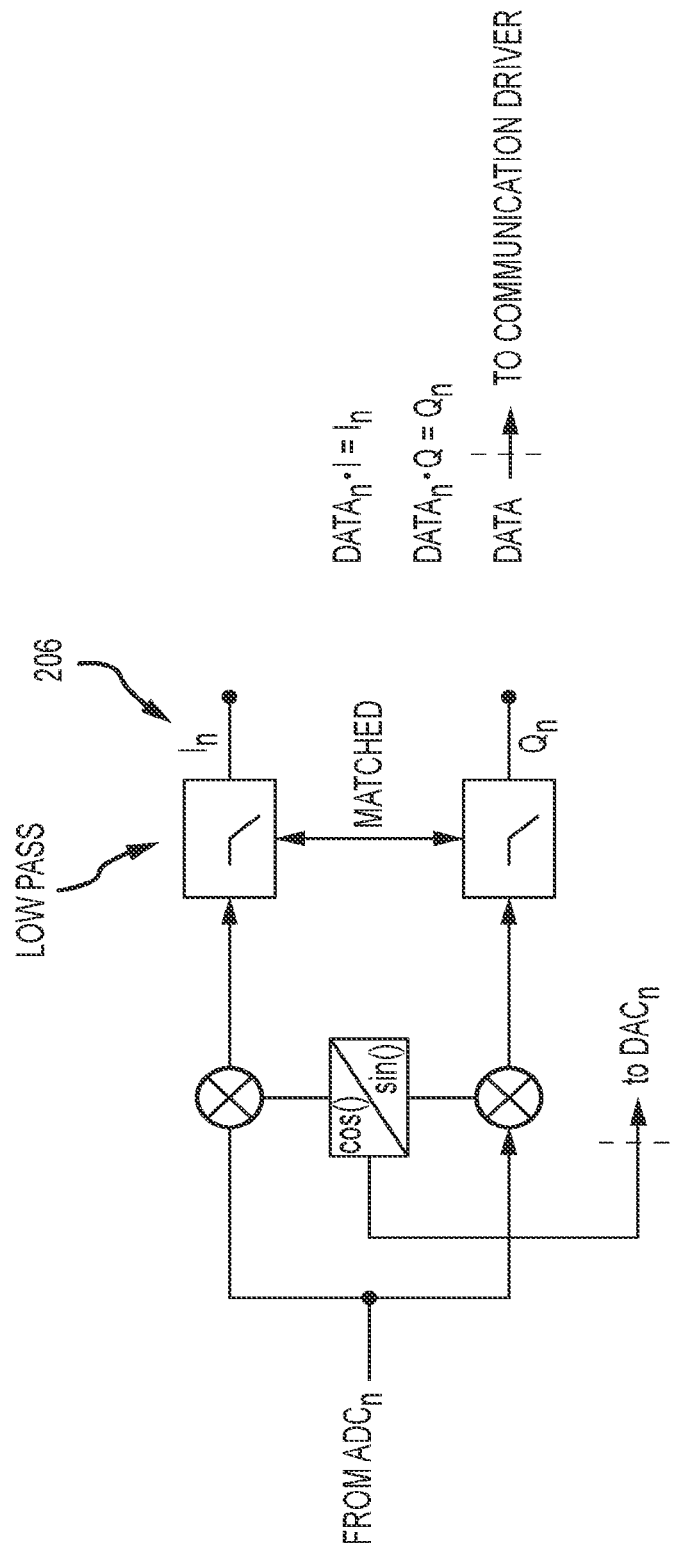
FIG. 8 is a block diagram of the mathematics inside the MCU.

In particular, the analyzer 126 has a microcontroller (MCU) 202 that, among other things, generates, through DACs 204, the transmit signals $120_1$, $120_2$, $120_3$ that excite the coils $106_1$, $106_2$, $106_3$. As previously stated, these transmit signals generated by the oscillators 120 are chosen at different, distinct, frequencies. The signal conditioning blocks 127 effectively condition the signals received from the three receive coils $108_1$, $108_2$, and $108_3$. In addition, the MCU 202 mathematically processes the amplitude/phase detection block 130 shown in FIG. 5. A block diagram 206 of the mathematics inside the MCU is shown in FIG. 8.

Block 206 consists of synchronous sine/cosine functions being heterodyned with the measured signal from the Analog to Digital converter, which modulates the desired frequency down to DC. The resulting signals are low pass filtered to remove components from the interfering frequencies. The resulting data is then packaged and sent out via the communications interface through cable 114. The data format is commonly known as "in-phase/quadrature" or IQ, and represents a complex number. The magnitude of the complex number is the amplitude of the frequency signal and the angle is the phase. These output signals are read and translated in the remote controller (not shown).

Figure 9:
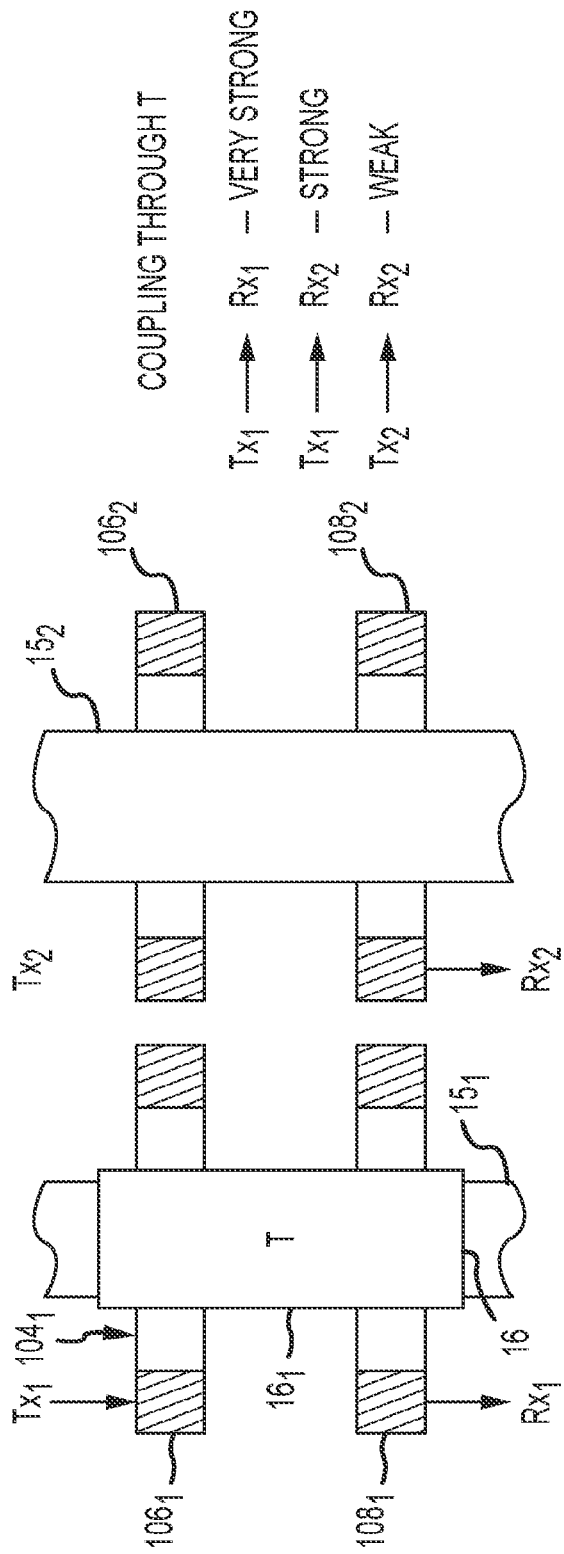
FIG. 9 is a diagram of two lance hoses inside a sensor module.

As an example, consider a situation in which the stop block extension 16 on a hose $15_1$ is within the bore $104_1$ through transmit coil $106_1$ and receive coil $108_1$ and there is no stop block extension 16 in the adjacent bore $104_2$ within coil set $106_2$, $108_2$ as shown in FIG. 9. In this situation, the signal from $106_1$ as sensed by $108_2$ is fairly strong. However, it is of a different frequency. Passing the signal $108_1$ through Band Pass filter $127_1$ generates a large signal amplitude for signal $108_1$ and suppresses the signal processed through bandpass filter $127_1$ from receive coil $108_2$. This shown in the right hand upper graph of FIG. 7. At the same time, the processing of signals in receive coil $108_2$ are shown in the lower set of graphs in FIG. 7. The amplitude of receive coil $108_2$ from coils $106_1$ and $106_2$ are closer in magnitude. Again, however, they are of different frequencies. Processing the signal from receive coil $108_2$ through a band pass filter tuned to the frequency of transmit coil $106_2$ results in a suppression of the signal from $106_1$ while retaining the magnitude of signal from transmit coil $106_2$.

Figure 7:
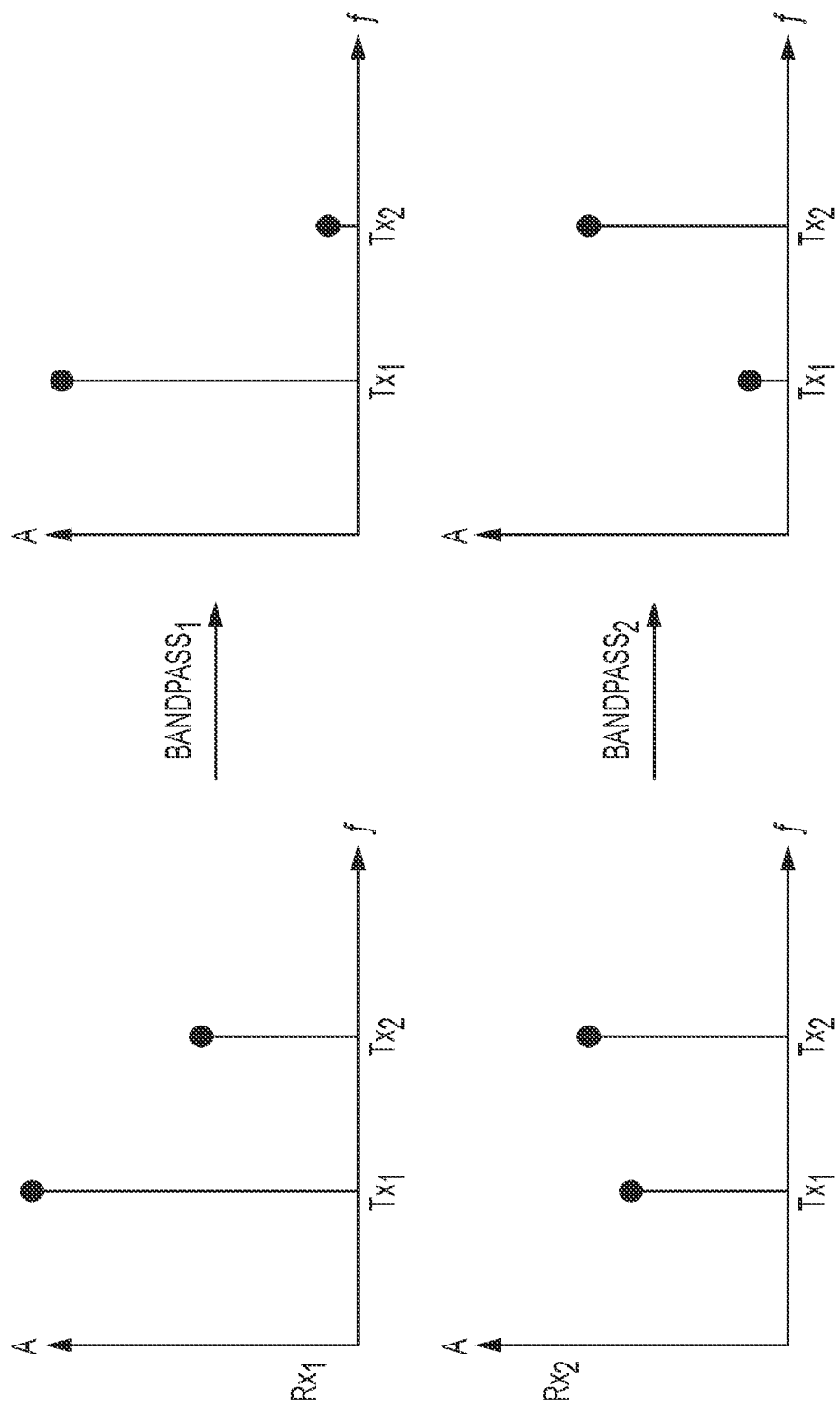
FIG. 7 is a set of simplified signal graphs for the signals from lance hoses in a module as shown in FIG. 9.

Comparing the two right hand graphs in FIG. 7, it can be seen that the larger amplitude signal from receive coil $108_1$ of signals from the transmit coils $106_1$ and $106_2$ clearly indicate presence of a different material, i.e. metal, within coils $106_1$, and $108_1$. In this case, the stop extension's presence causes the signal in adjacent bore $104_1$ as measured by $108_1$ to be much stronger than that of the signal through band pass filter $127_2$. This difference is utilized by the remote controller as indicative of the presence of the hose stop extension 16 being within the bore $104_1$ of module 100.

The circuit 101 shown in FIGS. 5-8 for the module 100 shown in FIG. 2 is the same for the module 100 shown in FIG. 1 in the lance guide tube outlet block 13 at the front end of drive 10.

While the above disclosure has been described with reference to one exemplary embodiment, many changes could be made without departing from this disclosure. For example, while the printed circuit board 200 is shown as extending across the module 100, it could be simplified or miniaturized into a single chip carried within the module 100. Three circuits are described and shown for a three lance module. It is to be understood that a module 100 could alternatively be constructed for two lances, or any number of lances depending on the configuration of the lance drive 10.

Alternatively, rather than outputting a digital communication signal, as described by the circuitry shown, an analog current or voltage signal such as a 4-20 mA or 0-10v could be outputted by the module 100 for subsequent processing.

All such changes, alternatives and equivalents in accordance with the features and benefits described herein, are within the scope of the present disclosure. Such changes and alternatives may be introduced without departing from the spirit and broad scope of our disclosure as defined by the claims below and their equivalents.

What is claimed is:

1. A system for detecting a target metal object on one of a plurality of flexible hoses arranged in close proximity to each other, comprising:
    a first signal generator generating and sending a first signal to a first transmit coil arranged around a first of the plurality of hoses;
    a second signal generator generating and sending a second signal to a second transmit coil arranged around a second one of the plurality of hoses;
    a first receive circuit receiving a first received signal generated by the first transmit coil in response to the first signal, in a first receive coil arranged around the one of the plurality of hoses around which the first transmit coil is arranged;
    a second receive circuit receiving a second received signal generated by the second transmit coil in response to the second signal, in a second receive coil arranged around the second one of the plurality of hoses around which the second transmit coil is arranged, wherein the second receive coil also receives the first received signal and wherein the first receive coil also receives the second received signal; and a processor separating the first and second received signals into a separate first signal corresponding to the first received signal and a second signal corresponding to the second received signal.

2. The system according to claim 1, wherein the processor further compares the separated first and second signals.

3. The system according to claim 1, further comprising a converter converting the separated first and second signals into corresponding digital signals for further processing.

4. The system according to claim 3, wherein the digital signals correspond to magnitude and phase of each of the first received signal and the second received signal.

5. The system according to claim 4, wherein the processor further compares signal magnitudes of the first and second digital signals, and determines a presence of the target metal object on one of more of the first or the second of the plurality of hoses based on the comparison.

6. The system according to claim 1, wherein the processor separates the first and second received signals via frequency domain multiplexing.

7. The system according to claim 1, wherein the first of the plurality of hoses is immediately adjacent to the second of the plurality of hoses.

8. The system according to claim 1, wherein the first receive coil and the first transmit coil are axially aligned, and wherein the second receive coil and the second transmit coil are axially aligned.

9. The system according to claim 1, wherein the first received signal and the second received signal both comprise frequencies below 30 kHz, wherein the first and second of the plurality of hoses contain a dielectric material therein.

10. The system according to claim 1, wherein the system further comprises:
   a third signal generator generating and sending a third signal at a third frequency to a third transmit coil arranged around a third one of the plurality of hoses; and
   a third receive circuit receiving a third received signal at the third frequency, generated by the third transmit coil in response to the third signal, in a third receive coil arranged around the third one of the plurality of hoses around which the third transmit coil is arranged, wherein the third receive coil is arranged in close proximity to the first and the second receive coils such that received signals in each of the first, second, and third receive coils include first, second, and third signals from the first, second, third transmit coils;
   wherein the processor further separates the received signals into the received first signal corresponding to the first signal and the received second signal corresponding to the second signal and the received third signal corresponding to the third signal.

11. The system according to claim 10, further comprising a converter for converting the separated first, second, and third signals into corresponding digital signals for further processing.

12. The system according to claim 11, wherein the processor compares signal magnitudes of the first, second, and third digital signals, and determines a presence of the target metal object on one of more of the first, second, or third of the plurality of hoses based on the comparison.

13. The system according to claim 12, wherein the processor further determines a change in magnitude of one of the signal magnitudes different from the other two magnitudes.

14. The system according to claim 12, wherein the processor separates the first, second, and third received signals via frequency domain multiplexing.

15. The system according to claim 12, wherein the first of the plurality of hoses is immediately adjacent to one or both of the second and third of the plurality of hoses, and the second of the plurality of hoses is immediately adjacent to one or both of the first and third of the plurality of hoses.

16. A method for distinguishing a target metal object from at least one other object in close proximity to the target metal object, the method comprising:
   transmitting a first signal at a first frequency and amplitude via a first transmit coil to a first receive coil arranged around a first of the plurality of hoses and axially aligned with the first transmit coil to generate a first received signal;
   transmitting a second signal at a second frequency and amplitude via a second transmit coil to a second receive coil arranged around a second of the plurality of hoses and axially aligned with the second transmit coil to generate a second received signal, wherein the second receive coil is in close proximity to the first receive coil such that received signals in each of the first and second receive coils include both the first and second signals transmitted from the first and second transmit coils;
   separating the received signals into the first received signal corresponding to the first signal and the second received signal corresponding to the second signal; and
   converting the separated first and second signals into corresponding digital signals;
   comparing signal magnitudes of the first and second digital signals; and
   detecting a presence of a target metal object on one or more of the first or second of the plurality of hoses based on the comparing.

17. The method according to claim 16, wherein the digital signals correspond to magnitude and phase of each of the first received signal and the second received signal.

18. The method according to claim 16, wherein the method further comprises:
   transmitting a third signal at a third frequency and amplitude via a third transmit coil to a third receive coil arranged around a third of the plurality of hoses and axially aligned with the third transmit coil to generate a third received signal;
   wherein the third receive coil is arranged in close proximity to the first and the second receive coils such that received signals in each of the first, second, and third receive coils include first, second, and third signals from the first, second, third transmit coils; and
   separating the received signals into the received first signal corresponding to the first signal and the received second signal corresponding to the second signal and the received third signal corresponding to the third signal.

19. The method according to claim 18, wherein the method further comprises:
   converting the separated first, second, and third signals into corresponding digital signals;
   comparing signal magnitudes of the first, second, and third digital signals; and
   detecting a presence of a target metal object on one or more of the first, second, or third of the plurality of hoses based on the comparing.

20. The method according to claim 16, wherein separating the received signals comprises separating the received signals via frequency domain multiplexing.

\* \* \* \* \*